United States Patent
Kirihata

(10) Patent No.: US 9,917,965 B2
(45) Date of Patent: Mar. 13, 2018

(54) IMAGE FORMING APPARATUS AND METHOD FOR CONTROLLING IMAGE FORMING APPARATUS

(71) Applicant: CANON KABUSHIKI KAISHA, Tokyo (JP)

(72) Inventor: Daiji Kirihata, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/791,121

(22) Filed: Jul. 2, 2015

(65) Prior Publication Data

US 2016/0006896 A1    Jan. 7, 2016

(30) Foreign Application Priority Data

Jul. 7, 2014  (JP) ................................. 2014-139871

(51) Int. Cl.
G06F 3/12 (2006.01)
H04N 1/00 (2006.01)

(52) U.S. Cl.
CPC .............................. H04N 1/00498 (2013.01)

(58) Field of Classification Search
CPC ............................................... H04N 1/00498
USPC ...................................................... 358/1.13
See application file for complete search history.

(56) References Cited

U.S. PATENT DOCUMENTS

| | | | |
|---|---|---|---|
| 8,194,260 B2 * | 6/2012 | Kadowaki | H04N 1/0035 358/1.13 |
| 2011/0075180 A1 * | 3/2011 | Koike | G06F 3/1204 358/1.13 |
| 2013/0050733 A1 * | 2/2013 | Kuroda | G06K 15/005 358/1.13 |

FOREIGN PATENT DOCUMENTS

JP          2006-087144 A          3/2006

* cited by examiner

*Primary Examiner* — Neil R McLean
(74) *Attorney, Agent, or Firm* — Canon USA Inc., IP Division

(57) ABSTRACT

An image forming apparatus includes an acquisition unit that acquires setting information of a user from a server when a user logs into the apparatus, a determination unit that determines whether the setting information can be used in the apparatus, a setting unit that changes the setting information determined to be usable in the image forming apparatus and then sets the changed setting information in the apparatus, and a transmission unit that transmits the setting information set in the image forming apparatus to the server at a predetermined timing, wherein the transmission unit does not transmit the setting information that has been changed.

10 Claims, 10 Drawing Sheets

| | 501 | 502 | 503 | 504 |
|---|---|---|---|---|
| | SETTINGS | RANGE IN SETTING SERVER 100 | RANGE IN MFP 101 | RANGE IN MFP 102 |
| | DISPLAY LANGUAGE SETTING | 1. JAPANESE<br>2. ENGLISH<br>3. FRENCH<br>4. ITALIAN<br>5. GERMAN<br>6. SPANISH<br>7. CHINESE | 1. JAPANESE (DEFAULT)<br>2. ENGLISH | 2. ENGLISH (DEFAULT)<br>3. FRENCH<br>4. ITALIAN<br>5. GERMAN<br>6. SPANISH |
| | FINISHING SETTING | 1. STAPLE<br>2. DOUBLE STAPLE<br>3. TWO-HOLE PUNCH<br>4. THREE-HOLE PUNCH<br>5. FOUR-HOLE PUNCH<br>6. STAPLELESS BINDING<br>7. NONE | 1. STAPLE (DEFAULT)<br>2. DOUBLE STAPLE<br>7. NONE | 1. STAPLE<br>2. DOUBLE STAPLE<br>3. TWO-HOLE PUNCH<br>4. THREE-HOLE PUNCH<br>5. FOUR-HOLE PUNCH<br>7. NONE (DEFAULT) |

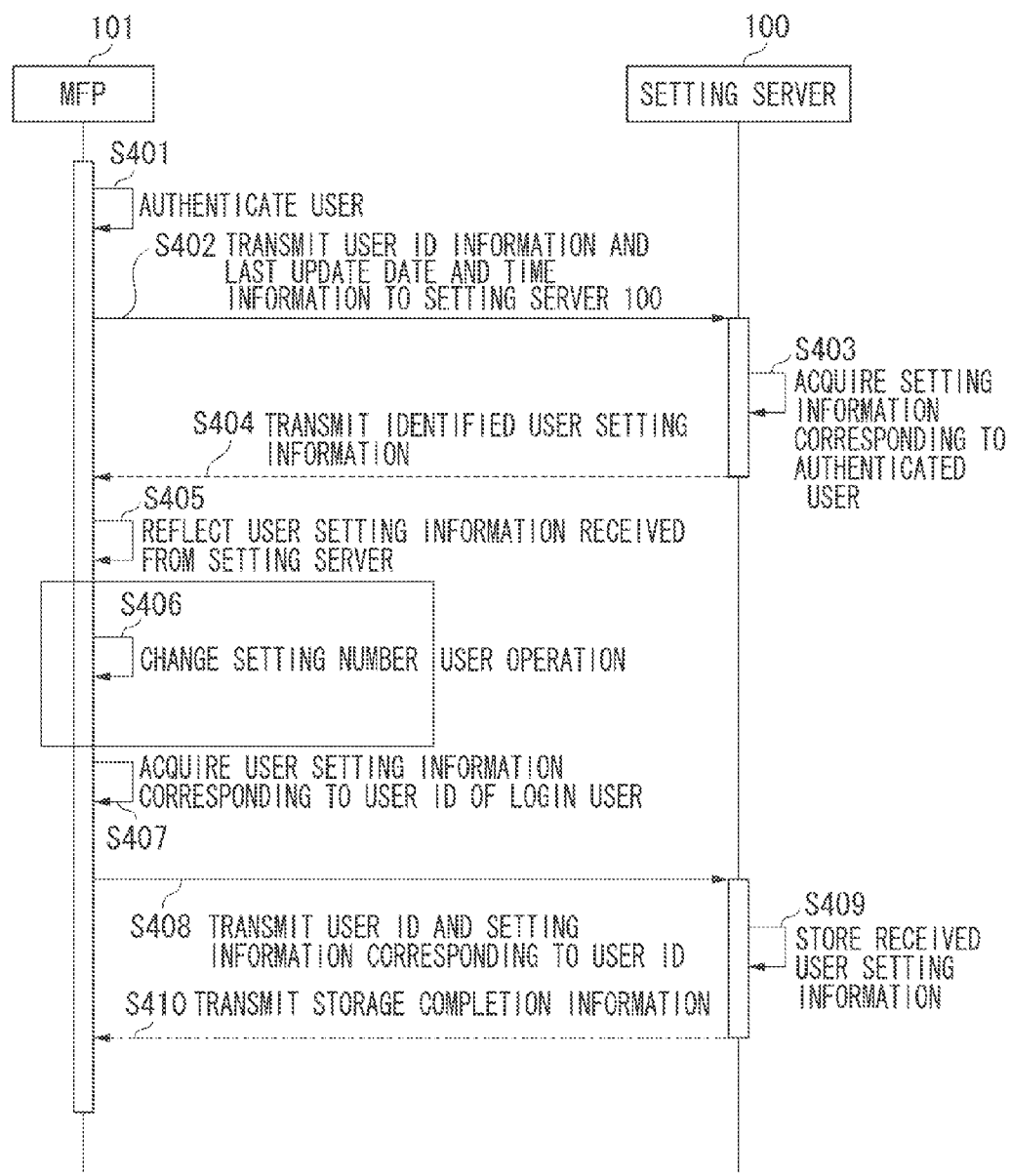

FIG. 5

| SETTINGS | RANGE IN SETTING SERVER 100 | RANGE IN MFP 101 | RANGE IN MFP 102 |
|---|---|---|---|
| DISPLAY LANGUAGE SETTING | 1. JAPANESE<br>2. ENGLISH<br>3. FRENCH<br>4. ITALIAN<br>5. GERMAN<br>6. SPANISH<br>7. CHINESE | 1. JAPANESE (DEFAULT)<br>2. ENGLISH | 2. ENGLISH (DEFAULT)<br>3. FRENCH<br>4. ITALIAN<br>5. GERMAN<br>6. SPANISH |
| FINISHING SETTING | 1. STAPLE<br>2. DOUBLE STAPLE<br>3. TWO-HOLE PUNCH<br>4. THREE-HOLE PUNCH<br>5. FOUR-HOLE PUNCH<br>6. STAPLELESS BINDING<br>7. NONE | 1. STAPLE (DEFAULT)<br>2. DOUBLE STAPLE<br>7. NONE | 1. STAPLE<br>2. DOUBLE STAPLE<br>3. TWO-HOLE PUNCH<br>4. THREE-HOLE PUNCH<br>5. FOUR-HOLE PUNCH<br>7. NONE (DEFAULT) |

| | USER A | | USER B | |
|---|---|---|---|---|
| | DISPLAY LANGUAGE | FINISHING | DISPLAY LANGUAGE | FINISHING |
| 901 — SETTING NUMBER IN SETTING SERVER 100 | 3 | 7 | 1 | 3 |
| 902 — WHEN MFP 101 STARTS BEING USED | 1/ON | 7/OFF | 1/OFF | 1/ON |
| 903 — AFTER SETTING HAS BEEN CHANGED | 2/OFF | 7/OFF | 1/OFF | 1/ON |
| 904 — WHETHER TO BE TRANSMITTED | TO BE TRANSMITTED | TO BE TRANSMITTED | TO BE TRANSMITTED | NOT TO BE TRANSMITTED |
| 905 — SETTING NUMBER IN SETTING SERVER 100 AFTER SETTING NUMBER HAS BEEN REFLECTED | 2 | 7 | 1 | 3 |

IMAGE FORMING APPARATUS AND METHOD FOR CONTROLLING IMAGE FORMING APPARATUS

BACKGROUND

Field

Aspects of the present invention generally relate to an image forming apparatus that communicates with a server via a network, and in particular relates to an image forming apparatus provided with a function of acquiring setting information of a user stored on a server and of customizing settings of the image forming apparatus in accordance with the acquired setting information.

Description of the Related Art

Currently, an image forming apparatus provided with a copy function or a print function is also provided with a function of customizing, for a user who logs in to the image forming apparatus, settings of a display language or settings of a screen to be displayed immediately after the user logs in to the image forming apparatus.

In addition, it is known that setting information of a user is stored on a server connected to a network and is managed collectively so that the setting information can be shared among a plurality of image forming apparatuses. In such management, each image forming apparatus communicates with the server so as to synchronize the setting information stored in each image forming apparatus with setting information on the server.

Japanese Patent Application Laid-Open No. 2006-87144 discusses a facsimile apparatus that can communicate with a server that manages setting information. This facsimile apparatus, upon acquiring a user identification (ID) from an ID card, acquires setting information of the corresponding user from the server and customizes settings of the facsimile apparatus in accordance with the acquired setting information. In addition, when the setting information is changed while the user is using the facsimile apparatus, the setting information of the facsimile apparatus on the server also needs to be updated, and thus the facsimile apparatus transmits the changed setting information to the server.

There is, however, a case in which setting information of a user acquired from a server cannot be used in an image forming apparatus depending on the image forming apparatus.

For example, it is assumed that setting information of a display language is registered on the server as the setting information of a user, and "French" is registered on the server as a number of the setting information of the display language. Meanwhile, available display languages in the image forming apparatus include only "Japanese" and "English". In this case, the image forming apparatus acquires "French" as the setting information of the display language from the server when the user logs in to the image forming apparatus. However, even if the image forming apparatus acquires "French" as the setting information, the image forming apparatus does not support French. Therefore, the image forming apparatus is unable to switch the display language to French. Thus, the setting information acquired from the server may be changed to, for example, "Japanese", which is a default setting.

As described above, if an image forming apparatus that has acquired setting information that cannot be used therein changes the acquired setting information to setting information that can be used therein and transmits the changed setting information to a server, the setting information that a user originally wants to use is also updated on the server, which reduces usability.

For example, when the image forming apparatus, in which only "English" and "Japanese" are available, as described above acquires user setting information of "French", the setting information of the user on the server is also changed from "French" to "Japanese". Then, if the user logs in to a different image forming apparatus that supports French, since the number of the setting information managed on the server has been changed from "French" to "Japanese", the user is unable to operate a screen by using the language setting that the user originally wants to use, which reduces usability.

SUMMARY

Aspects of the present invention are generally directed to an image forming apparatus that prevents setting information of a user on a server from being updated to changed setting information when the setting information of the user has been changed under a specific condition in the image forming apparatus, and a method for controlling the image forming apparatus.

According to an aspect of the present invention, an image forming apparatus that communicates with a server configured to store setting information includes an acquisition unit configured to acquire setting information of a user from the server when the user logs into the image forming apparatus, a determination unit configured to determine whether the acquired setting information of the user can be used in the image forming apparatus, a setting unit configured to set, in the image forming apparatus, the setting information of the user determined to be usable in the image forming apparatus, to change the setting information of the user determined not to be usable in the image forming apparatus to setting information usable in the image forming apparatus, and then set the changed setting information in the image forming apparatus, and a transmission unit configured to transmit the setting information of the user set in the image forming apparatus to the server at a predetermined timing, wherein the setting information of the user changed by the setting unit to the setting information usable in the image forming apparatus is set not to be transmitted.

According to the present disclosure, setting information of a user stored on a server can be prevented from being changed to unintended setting information.

Further features of the present disclosure will become apparent from the following description of exemplary embodiments with reference to the attached drawings.

BRIEF DESCRIPTION OF THE DRAWINGS

FIG. 4 illustrates an overall sequence in the system.

FIG. 5 illustrates an example of user setting information.

FIG. 9 illustrates an example of user setting information stored in the setting server and the MFP.

DESCRIPTION OF THE EMBODIMENTS

Hereinafter, exemplary embodiments will be described with reference to the drawings.

Figure 1:
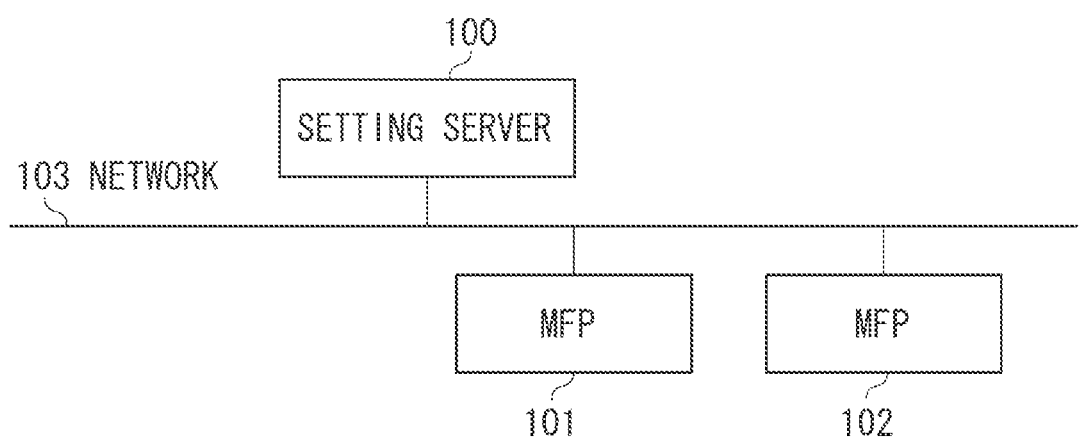
FIG. 1 illustrates an overall configuration of a system.

FIG. 1 illustrates an overall configuration of a system according to a first exemplary embodiment. In the system, a setting server 100 and multifunction peripherals (MFPs) 101 and 102 are interconnected via a network 103.

The setting server 100 is a server that manages user setting information, which is associated with a user, to be used in the MFP 101 or the MFP 102. The setting server 100 has a function of, upon receiving a request for acquiring setting information of a user (login user) who has logged in to the MFP 101 or 102, returning the setting information of the corresponding user. In the present exemplary embodiment, the setting information includes, for example, a custom menu setting, a display language setting, an accessibility setting, a setting of an initial screen displayed after a login, a preference setting for each function, address book information.

The MFPs 101 and 102 are image forming apparatuses that are each provided with a copy function, a scan function, a network print function, and the like. The MFP 101 is further provided with a function of authenticating a user. When the MFP 101 executes login processing of an authenticated user, the MFP 101 transmits a request for acquiring setting information of the login user to the setting server 100, and acquires the setting information of the login user as a response to the request. The MFP 102 is also provided with a function similar to that of the MFP 101.

In the present exemplary embodiment, an MFP is described as an example of the image forming apparatus. However, the image forming apparatus is not limited to an MFP and may be, for example, a single function printer (SFP).

Figure 2:
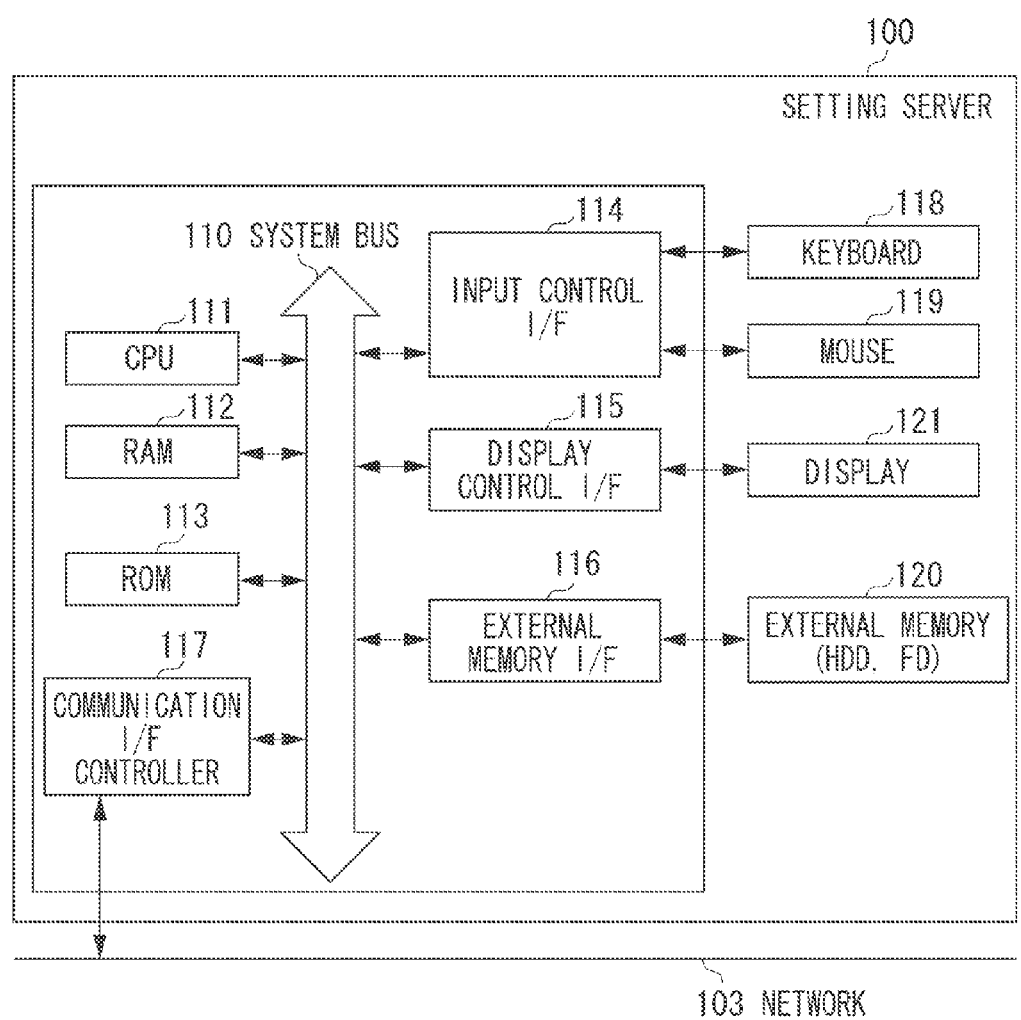
FIG. 2 illustrates a hardware configuration of a setting server.

FIG. 2 illustrates an example of a hardware configuration of the setting server 100. The setting server 100 includes a central processing unit (CPU) 111, a random-access memory (RAM) 112, a read-only memory (ROM) 113, an input control interface (I/F) 114, a display control I/F 115, an external memory I/F 116, and a communication I/F controller 117. These components are connected to a system bus 110. The components connected to the system bus 110 are configured to be capable of exchanging data with one another via the system bus 110.

The CPU 111 is an arithmetic unit that controls the components and calculates or processes data. The RAM 112 is a volatile memory and is used as a temporary storage area, such as a main memory and a work area of the CPU 111. The ROM 113 is a non-volatile memory and stores, in respective predetermined areas therein, image data, other pieces of data, various programs for causing the CPU 111 to operate, and the like.

The CPU 111, using the RAM 112 as a work memory, controls the components of the setting server 100 in accordance with a program stored, for example, in the ROM 113. The area in which the program for causing the CPU 111 to operate is stored is not limited to the ROM 113, and the program may be stored in an external memory 120.

The input control I/F 114 receives a user operation via a keyboard 118 or a mouse 119, generates a control signal corresponding to the user operation, and supplies the generated control signal to the CPU 111. The CPU 111 controls the components of the setting server 100 in accordance with the supplied control signal. This configuration makes it possible to cause the setting server 100 to perform an operation corresponding to the user operation.

The display control I/F 115 outputs a display signal for displaying an image on a display 121. For example, the CPU 111 generates a display control signal in accordance with the program and supplies the generated display control signal to the display control I/F 115. The display control I/F 115 generates a display signal based on the supplied display control signal and outputs the generated display signal to the display 121. For example, the display control I/F 115 displays a graphical user interface (GUI) screen that constitutes a GUI on the display 121 based on the display control signal generated by the CPU 111.

The external memory 120 can be mounted onto the external memory I/F 116. The external memory I/F 116 reads out data from the external memory 120 mounted thereon and writes data into the external memory 120 in accordance with the control by the CPU 111. Depending on the configuration, the external memory 120 can be used in place of the ROM 113.

The communication I/F controller 117 performs communication with external apparatuses via, for example, a local area network (LAN), the Internet, and various networks, such as a wired network and a wireless network, in accordance with the control by the CPU 111.

Figure 3:
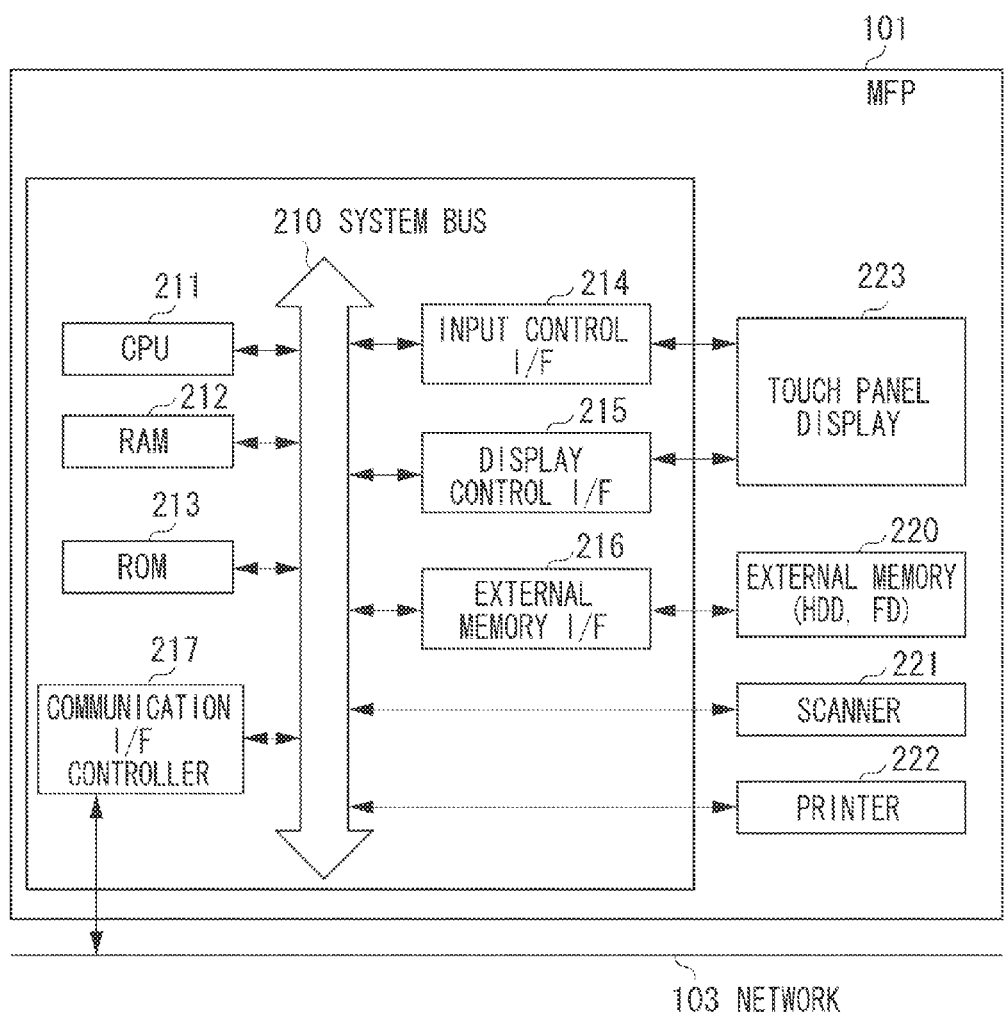
FIG. 3 illustrates a hardware configuration of a multifunction peripheral (MFP).

FIG. 3 illustrates an example of the hardware configuration of the image forming apparatus (MFP 101). The configuration of the MFP 102 is similar to that of the MFP 101, and thus description thereof will be omitted.

The MFP 101 includes a CPU 211, a RAM 212, a ROM 213, an input control I/F 214, a display control I/F 215, an external memory I/F 216, and a communication I/F controller 217. These components are connected to a system bus 210. The components connected to the system bus 210 are configured to be capable of exchanging data with one another via the system bus 210.

The CPU 211 is an arithmetic unit that controls the components of the MFP 101 and calculates or processes data. The RAM 212 is a volatile memory and is used as a temporary storage area, such as a main memory and a work area of the CPU 211. The ROM 213 is a non-volatile memory and stores, in respective predetermined areas therein, image data, other pieces of data, various programs for causing the CPU 211 to operate, and the like.

The CPU 211, using the RAM 212 as a work memory, controls the components of the MFP 101 in accordance with a program stored, for example, in the ROM 213. The area in which the program for causing the CPU 211 to operate is stored is not limited to the ROM 213, and the program may be stored in an external memory 220.

The input control I/F 214 receives a user operation via a touch panel display 223, generates a control signal corresponding to the user operation, and supplies the generated control signal to the CPU 211. The CPU 211 controls the components of the MFP 101 in accordance with the supplied control signal. This configuration makes it possible to cause the MFP 101 to perform an operation corresponding to the user operation.

The display control I/F 215 outputs a display signal for displaying an image on the touch panel display 223. For example, the CPU 211 generates a display control signal in accordance with the program and supplies the generated display control signal to the display control I/F 215. The display control I/F 215 generates a display signal based on the supplied display control signal and outputs the generated display signal to the touch panel display 223. For example, the display control I/F 215 displays a GUI screen that constitutes a GUI based on the display control signal generated by the CPU 211.

The touch panel display 223 is an input device in which a touch panel and a display are integrated into a unit, and is connected to the input control I/F 214 and the display control I/F 215. The touch panel is configured in such a manner that the optical transmittance thereof is set so as not to hinder a display on the display and is attached on an upper layer of the display surface of the display. In addition, an input coordinate on the touch panel is associated to a display coordinate on the display. With this configuration, a GUI that can be operated by a user as if the user is directly operating the screen displayed on the display in the touch panel display 223 can be constituted.

The external memory 220 can be mounted on the external memory I/F 216. The external memory I/F 216 reads out data from the external memory 220 mounted thereon and writes data into the external memory 220 in accordance with the control by the CPU 211. The external memory 220 is a hard disk drive (HDD), a flexible disk, a compact disc (CD), a digital versatile disc (DVD), a flash memory, or a memory card, for example. Depending on the configuration, the external memory 220 can be used in place of the ROM 213.

The communication I/F controller 217 performs communication with external apparatuses via, for example, a LAN, the Internet, and various networks, such as a wired network and a wireless network, in accordance with the control by the CPU 211.

A scanner 221 reads an original document and generates image data in accordance with the control by the CPU 211. For example, the CPU 211 causes the scanner 221 to execute scan processing in response to a user instruction input via the input control I/F 214. The scanner 221 reads an original document placed on a platen glass or an auto document feeder (ADF), digitizes the read document, and generates image data. The scanner 221 stores the generated image data in the external memory 220 via the external memory I/F 216.

A printer 222 executes print processing of image data stored in the external memory 220 in accordance with the control by the CPU 211. For example, the CPU 211 causes the printer 222 to execute print processing in response to a user instruction input via the input control I/F 214 or a command instruction input from an external apparatus via the communication I/F controller 217. The printer 222 reads out image data from the external memory 220, converts the image data into a printable data format, and prints the converted image data on a paper document.

FIG. 4 illustrates an overall sequence in the system according to the present exemplary embodiment. The processing of the sequence performed in the setting server 100 illustrated in FIG. 4 is implemented by the CPU 111 executing a program stored in the ROM 113 of the setting server 100 and controlling each component via the system bus 110 and each I/F. In addition, the processing of the sequence performed in the MFP 101 is implemented by the CPU 211 executing a program stored in the ROM 213 of the MFP 101 and controlling each component via the system bus 210 and each I/F.

In step S401, the MFP 101 authenticates a user. More specifically, the user inputs a user ID and a password via the touch panel display 223, and the MFP 101 then collates the input user ID and password with user IDs and passwords stored in advance in the MFP 101. If there are a user ID and a password that match the input user ID and password, the MFP 101 determines that the user is a user who is permitted to use the MFP 101. In step S402, the MFP 101 transmits, to the setting server 100, user ID information that indicates the user ID of the authenticated user and last update date and time information that indicates the latest date and time at which user setting information has been acquired from the setting server 100. With this processing, the setting server 100 receives the user ID information and the last update date and time information from the MFP 101. In step S403, the setting server 100 acquires, from the external memory 120, setting information corresponding to the authenticated user based on the user ID information and the last update date and time information transmitted from the MFP 101. In addition, the setting server 100 identifies user setting information that has been updated at a timing after the date and time indicated in the last update date and time information. In step S404, the setting server 100 transmits the identified user setting information to the MFP 101, and the MFP 101 receives the setting information from the setting server 100. In step S405, the MFP 101 reflects the user setting information received from the setting server 100 on user setting information set in the MFP 101.

Thereafter, the user performs a desired user operation. For example, in step S406, the user changes a specific setting. At a predetermined timing after the user has performed the desired user operation, the MFP 101 stores the setting information of the user on the setting server 100. In the present exemplary embodiment, the processing of storing the setting information on the setting server 100 is executed when a logout instruction is received, as the predetermined timing. This timing, however, is not limited to the timing of a logout. For example, the predetermined timing may be a timing at which an execution of a copy job or a print job is instructed or a timing at which a job is finished normally. Alternatively, the predetermined timing may be a timing at which the user explicitly instructs that the setting information be stored on the setting server 100.

In step S407, upon receiving a logout instruction, the MFP 101 acquires the user setting information corresponding to the user ID of the login user. In step S408, the MFP 101 transmits, to the setting server 100, the user ID and the setting information acquired in step S407, and executes logout processing of the user. With this processing, the setting server 100 receives the user setting information transmitted from the MFP 101. In step S409, the setting server 100 stores the user setting information received from the MFP 101 on the setting server 100. In step S410, the setting server 100 transmits storage completion information to the MFP 101, and the MFP 101 receives the storage completion information from the setting server 100.

FIG. 5 illustrates examples of user setting information in the setting server 100 and the MFP 101 and ranges of numbers that can be set (range). A column 501 indicates contents of the settings. In the present exemplary embodiment, user setting information relating to a display language and user setting information relating to a finishing setting are illustrated. A column 502 indicates the ranges of numbers that can be set in the setting server 100 with respect to each setting. In the setting server 100, a number from numbers 1 to 7 can be set in the display language setting, and a number from numbers 1 to 7 can be set in the finishing setting. A column 503 indicates the ranges of numbers that can be set in the MFP 101 with respect to each setting. In the MFP 101, a number 1 or 2 can be set in the display language setting, and a number 1, 2, or 7 can be set in the finishing setting. A column 504 indicates the ranges of numbers that can be set in the MFP 102 with respect to each setting. In the MFP 102, a number from numbers 2 to 6 can be set in the display language setting, and a number from numbers 1 to 5 and 7 can be set in the finishing setting. In addition, a default setting is defined for each setting in the MFP 101 and the MFP 102, which will be described below in detail. In the present exemplary embodiment, the default setting for the display language setting in the MFP 101 is "1. JAPANESE". The default setting for the finishing setting in the MFP 101 is "1. STAPLE". In addition, the default setting for the display language setting in the MFP 102 is "2. ENGLISH". The default setting for the finishing setting in the MFP 102 is "7. NONE". The default settings may be changed by a specific user, such as an administrator.

Figure 6:
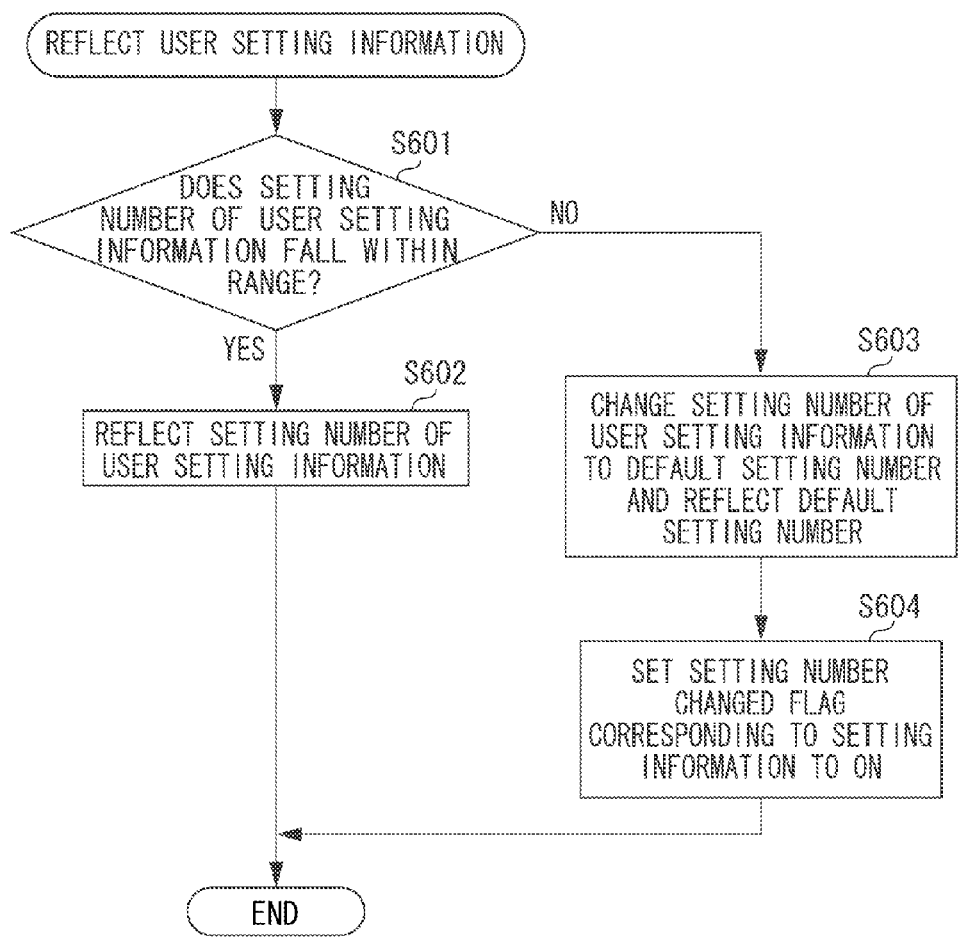
FIG. 6 is a flowchart illustrating processing of reflecting user setting information in the MFP.

FIG. 6 is a flowchart illustrating a detail of the processing in step S405. The processing illustrated in FIG. 6 is implemented by the CPU 211 executing a program stored in the ROM 213 and controlling each component via the system bus 210 and each I/F.

In step S601, the CPU 211 checks the number of the user setting information acquired from the setting server 100 and determines whether the number falls within a range. With this processing, whether the user setting information acquired from the setting server 100 can be used in the MFP 101 is determined.

For example, a case in which user setting information indicating that the number 7 is set in the finishing setting is acquired as the user setting information will be considered. In this case, since the range in the MFP 101 includes the numbers 1, 2, and 7, as illustrated in FIG. 5, the CPU 211 determines that the number falls within the range (YES in step S601). Then, the processing proceeds to step S602.

For example, a case in which user setting information indicating that the number 3 is set in the display language setting is acquired as the user setting information will be considered. In this case, since the range in the MFP 101 includes the numbers 1 and 2, as illustrated in FIG. 5, the CPU 211 determines that the number falls outside the range (NO in step S601). Then, the processing proceeds to step S603.

If the CPU 211 determines in step S601 that the user setting information falls within the range, in step S602, the CPU 211 reflects the user setting information acquired from the setting server 100 on the user setting information set in the MFP 101 without making any change. On the other hand, if the CPU 211 determines that the user setting information falls outside the range, in step S603, the number of the acquired user setting information is replaced by the number of the default setting that can be set in the MFP 101, and the default setting is reflected on the user setting information set in the MFP 101. Then, in step S604, a setting number changed flag corresponding to the setting information is made valid (ON).

Figure 7:
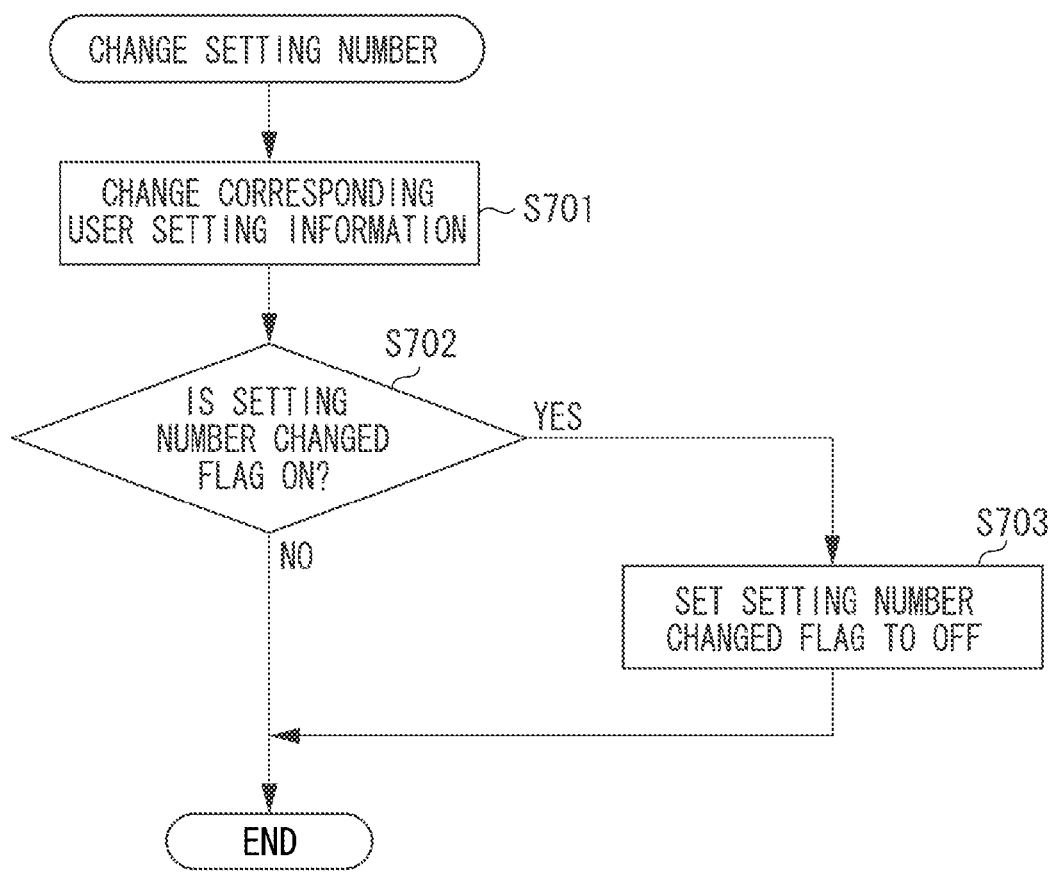
FIG. 7 is a flowchart illustrating processing of changing user setting information in the MFP.

FIG. 7 is a flowchart illustrating a detail of the processing in step S406. The processing illustrated in FIG. 7 is implemented by the CPU 211 executing a program stored in the ROM 213 and controlling each component via the system bus 210 and each I/F.

In step S701, the CPU 211 detects an operation on the touch panel display 223 by the user (login user) who has logged in to the MFP 101. If the CPU 211 determines that the detected operation is an instruction for changing a specific setting of the user setting information, the CPU 211 changes the corresponding number of the user setting information. In step S702, the CPU 211 checks the setting number changed flag associated with the changed user setting information to determine whether the setting number changed flag is set to ON. If the setting number changed flag is set to ON (YES in step S702), in step S703, the setting number changed flag is changed and set to OFF. An example in which the setting number changed flag is not changed and set to OFF in step S703 is also conceivable. This example is feasible in a case in which the setting number stored on the setting server 100 is not to be changed.

Figure 8:
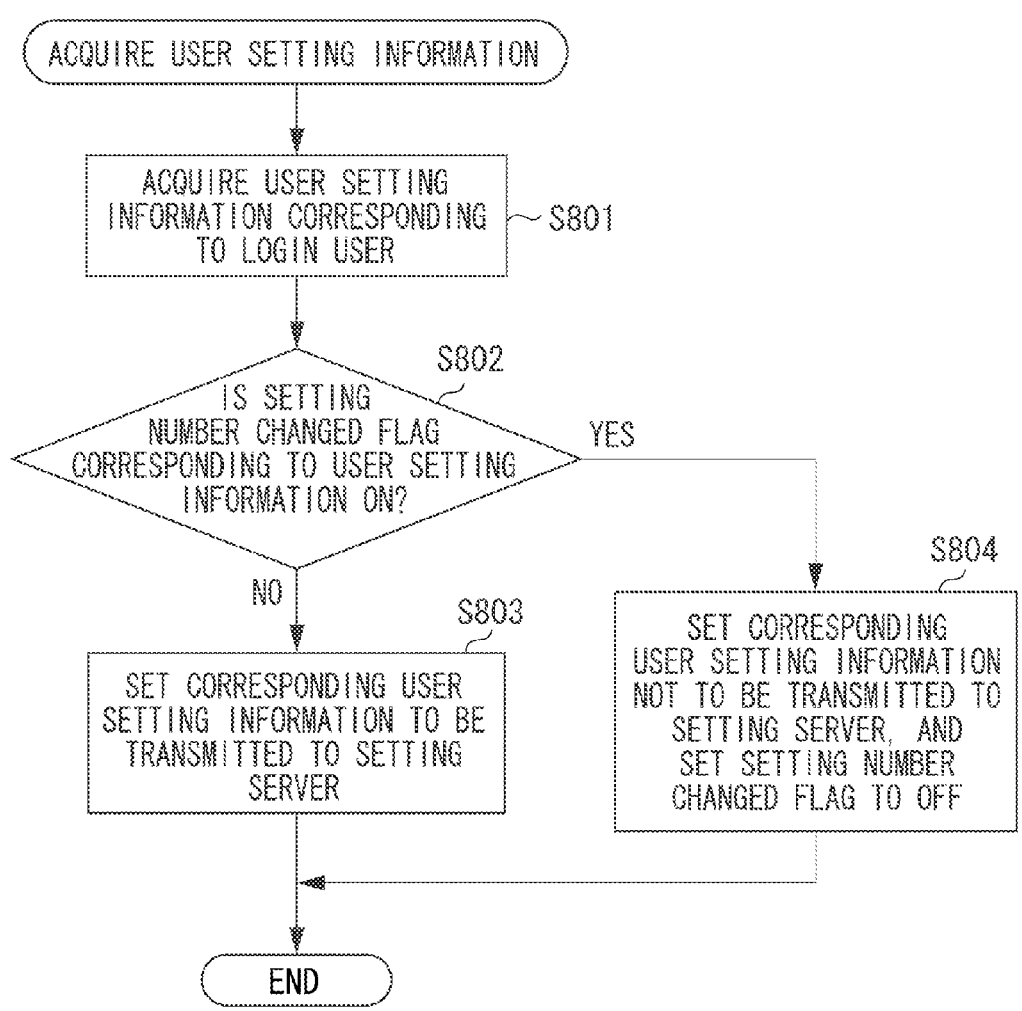
FIG. 8 is a flowchart illustrating processing of synchronizing user setting information changed in the MFP with user setting information on the setting server.

FIG. 8 is a flowchart illustrating a detail of the processing in step S407. The processing illustrated in FIG. 8 is implemented by the CPU 211 executing a program stored in the ROM 213 and controlling each component via the system bus 210 and each I/F.

In step S801, the CPU 211 acquires the user setting information, set in the MFP 101, corresponding to the login user. In step S802, the CPU 211 determines whether the setting number changed flag corresponding to the user setting information is set to ON or OFF. If the setting number changed flag is set to OFF (NO in step S802), in step S803, the corresponding user setting information is set to be transmitted to the setting server 100. If the setting number changed flag is set to ON (YES in step S802), in step S804, the corresponding user setting information is set not to be transmitted to the setting server 100, and the setting number changed flag corresponding to the setting information is set to OFF. In this manner, the user setting information for which the setting number changed flag is set to ON is set not to be transmitted to the setting server 100, whereby the setting information can be prevented from being replaced by a number (default number, i.e., default setting) that is not intended by the user.

FIG. 9 illustrates a table indicating how the setting information of each user is changed. In the present exemplary embodiment, the table illustrates how the display language setting and the finishing setting of a user A and a user B are changed in a period from when the users A and B start using the MFP to when the users A and B finish using the MFP. A row 901 indicates setting numbers initially registered in the setting server 100. The setting number of the display language setting for the user A is 3, and the setting number of the finishing setting is 7. The setting number of the display language setting for the user B is 1, and the setting number of the finishing setting is 3. A row 902 indicates the setting numbers set in the MFP 101 and the state of the setting number changed flag when the user A and the user B start using the MFP 101 under the settings indicated in the row 901. For the user A, the setting number of the display language setting registered in the setting server 100 is 3, which is outside the range in the MFP 101. Therefore, the setting number of the display language setting is automatically replaced by 1, which is the default number, and the setting number changed flag is set to ON. In a similar manner, the setting number of the finishing setting is 7, and the setting number changed flag is set to OFF. For the user B, the setting number of the display language setting is 1, and the setting number changed flag is set to OFF. The setting number of the finishing setting is 1, and the setting number changed flag is set to ON.

A row 903 indicates the setting numbers and the state of the setting number changed flag when a specific setting number has been changed from the numbers in the row 902. In the present exemplary embodiment, an example in which the setting number of the display language setting for the user A has been changed to 2 is illustrated. Herein, the setting number of the display language setting for the user A is changed to 2, and the setting number changed flag is also changed and set to OFF. A row 904 indicates whether each setting information is set to be transmitted when the setting information in the MFP 101 is transmitted to the setting server 100 in the state indicated in the row 903. Herein, the setting number changed flag for the finishing setting for the user B is set to ON, and thus the finishing setting is set not to be transmitted. The remaining settings are set to be transmitted. A row 905 indicates the setting numbers set in the setting server 100 after the setting numbers that are set to be transmitted as indicated in the row 904 are transmitted from the MFP 101 to the setting server 100 and the setting numbers are reflected on the setting numbers stored in the setting server 100. Herein, the MFP 101 transmits the number 2 as the setting number of the display language setting for the user A, and thus the setting number of the display language setting for the user A stored in the setting server 100 is changed to 2.

Figure 10A:
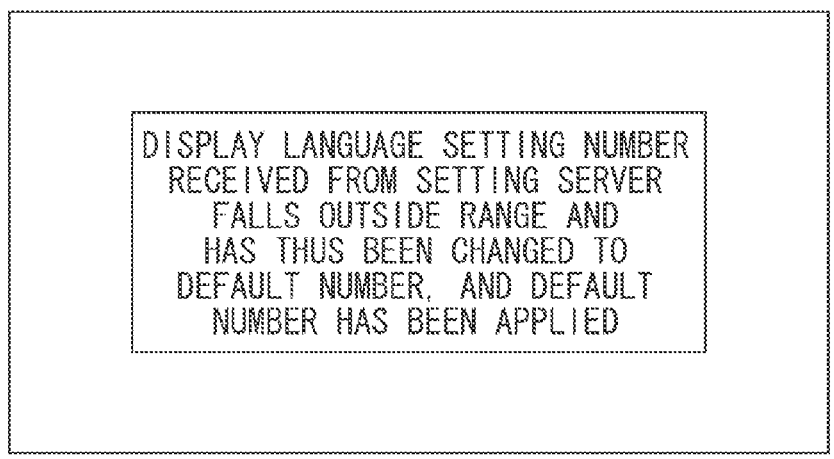
FIGS. 10A and 10B each illustrate an example of a screen displayed when user setting information is changed automatically.
Figure 10B:
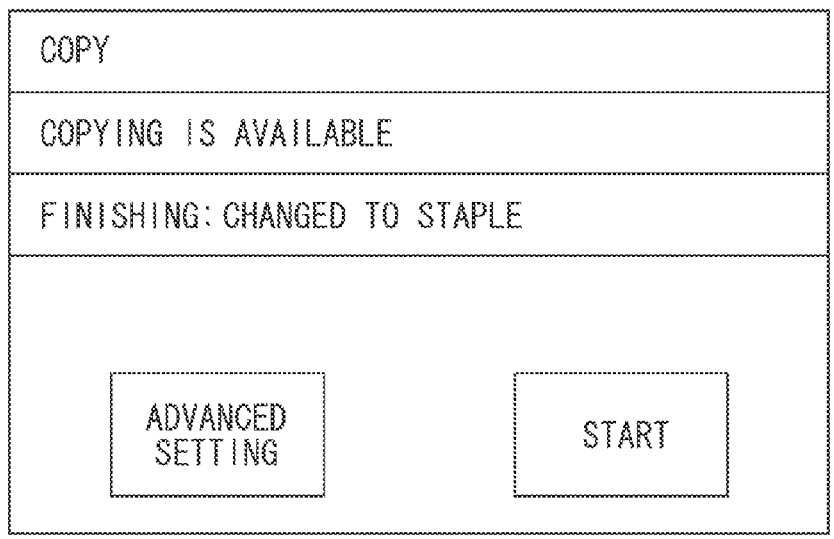

FIGS. 10A and 10B each illustrate an example of a warning screen to be displayed when the setting number of the setting information acquired from the setting server 100 while the user is using the MFP 101 falls outside the range in the MFP 101 and the setting number of the setting information has been replaced by the default number in the MFP 101. The warning screens illustrated in FIGS. 10A and 10B are displayed on the touch panel display 223 by the CPU 211.

FIG. 10A illustrates a warning screen to be displayed when the setting number of the user setting information pertaining to the display language acquired from the setting server 100 falls outside the range in the MFP 101 and the setting number of the user setting information of the display language for the user has been changed to 1 in the MFP 101. The MFP 101 notifies the user, via the warning screen, that the setting number of the setting information of the display language has been changed from the number registered in the setting server 100 to the default number in the MFP 101.

FIG. 10B illustrates a screen to be displayed when the setting number of the user setting information relating to the finishing setting acquired from the setting server 100 falls outside the range in the MFP 101 and, after the setting number of the finishing setting for the user has been set to 1 in the MFP 101, the user selects a copy function. Herein, the MFP 101 notifies the user that the setting number of the finishing setting has been changed from the number registered in the setting server 100 to the default number in the MFP 101.

As described thus far, according to the present exemplary embodiment, the setting number of the user setting information in the setting server 100 is not changed to a setting number that is not intended by the user. Thus, confusion does not arise when a user uses a plurality of MFPs, and desired setting information can be used.

Other Embodiments

Exemplary embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-139871, filed Jul. 7, 2014, which is hereby incorporated by reference herein in its entirety.

What is claimed is:
1. An image forming apparatus comprising:
a memory device that stores a set of instructions; and
at least one processor that executes the instructions to:
acquire setting information for a user from a server in a case where the user logs into the image forming apparatus;
display a first display screen according to the acquired setting information in a case where the acquired setting information is supported by the image forming apparatus;
display a second display screen according to pre-stored setting information of the image forming apparatus in a case where the acquired setting information is not supported by the image forming apparatus; and
transmit, to the server at a predetermined timing, updated setting information indicating a change by the user to the acquired setting information and not transmit, to the server at the predetermined timing, the pre-stored setting information of the image forming apparatus even if the pre-stored setting information is used instead of using the acquired setting information in a case where the acquired setting information is not supported by the image forming apparatus.

2. The image forming apparatus according to claim 1, wherein the at least one processor executes stored instructions in the memory device to:
reflect, on the image forming apparatus, as the pre-stored setting information, a default number, instead of a number included in the setting information acquired from the server in a case where the acquired setting information is not supported by the image forming apparatus.

3. The image forming apparatus according to claim 1 further comprising a display that displays a warning screen in a case where the setting information for the user not supported by the image forming apparatus is changed to the pre-stored setting information supported by usable in the image forming apparatus.

4. The image forming apparatus according to claim 1, wherein the predetermined timing is a timing of a logout.

5. The image forming apparatus according to claim 1, wherein the setting information is information of a display language setting.

6. The image forming apparatus according to claim 1, wherein the setting information is information of a finishing setting.

7. The image forming apparatus according to claim 1, wherein the at least one processor executes stored instructions in the memory device to:
change the setting information for the user in accordance with an instruction by a user who has logged into the image forming apparatus,
wherein setting information changed from the pre-stored setting information in accordance with the instruction is set to be transmitted to the server.

8. The image forming apparatus according to claim 1, wherein the setting information transmitted from the image forming apparatus to the server is transmitted from the server to another image forming apparatus in accordance with a request from the another image forming apparatus to the server.

9. A method for controlling an image forming, the method comprising:
acquiring setting information for a user from a server in a case where the user logs into the image forming apparatus;
displaying a first display screen according to the acquired setting information in a case where the acquired setting information is supported by the image forming apparatus;
displaying a second display screen according to pre-stored setting information of the image forming apparatus in a case where the acquired setting information is not supported by the image forming apparatus; and
transmitting, to the server at a predetermined timing, updated setting information indicating a change by the user to the acquired setting information and not transmit, to the server at the predetermined timing, the pre-stored setting information of the image forming apparatus even if the pre-stored setting information is used instead of using the acquired setting information in a case where the acquired setting information is not supported by the image forming apparatus.

10. A non-transitory computer-readable storage medium storing computer executable instructions that cause an image forming apparatus to execute a method, the method comprising:
acquiring setting information for a user from a server in a case where the user logs into the image forming apparatus;
displaying a first display screen according to the acquired setting information in a case where the acquired setting information is supported by the image forming apparatus;
displaying a second display screen according to pre-stored setting information of the image forming apparatus in a case where the acquired setting information is not supported by the image forming apparatus; and
transmitting, to the server at a predetermined timing, updated setting information indicating a change by the user to the acquired setting information and not transmit, to the server at the predetermined timing, the pre-stored setting information of the image forming apparatus even if the pre-stored setting information is used instead of using the acquired setting information in a case where the acquired setting information is not supported by the image forming apparatus.

* * * * *